United States Patent [19]

Arduser

[11] 4,074,651
[45] Feb. 21, 1978

[54] FORCED AERATING MEANS FOR INBOARD LIVE WELLS

[76] Inventor: Dell H. Arduser, Box 261, Osceola, Mo. 64776

[21] Appl. No.: 711,582

[22] Filed: Aug. 4, 1976

[51] Int. Cl.$^2$ .............................................. B63B 35/26
[52] U.S. Cl. ...................................... 114/255; 43/57; 114/183 R
[58] Field of Search ........... 114/255, 162, 165, 183 R; 9/1.1; 119/3, 5; 43/55-57

[56] References Cited

U.S. PATENT DOCUMENTS

| | | | |
|---|---|---|---|
| 2,936,542 | 5/1960 | Butler et al. | 43/57 |
| 3,093,105 | 6/1963 | Rebikoff | 114/162 |
| 3,220,140 | 11/1965 | Shirley, Sr. | 43/55 |
| 3,797,160 | 3/1974 | Lewis, Jr. | 43/55 |
| 3,822,498 | 7/1974 | Butler | 43/57 |
| 3,913,513 | 10/1975 | Pedone | 114/183 R |

OTHER PUBLICATIONS

Navpers 10788-B; Principles of Naval Engineering, p. 349, 1970.

Primary Examiner—Trygve M. Blix
Assistant Examiner—Stuart M. Goldstein
Attorney, Agent, or Firm—Zarley, McKee, Thomte, Voorhees & Sease

[57] ABSTRACT

A forced aerating apparatus for an inboard live well positioned within a fishing boat. The apparatus includes a water pipe having an intake end positioned outwardly of the boat below the water line. The water pipe has a discharge end positioned within the boat adjacent the well for supplying water thereto. A water aerator is provided on the discharge end of the water pipe. A water pump is mounted exteriorly of the well and is connected to the water pipe for selectively pumping water from outside the boat through the water aerator during the periods that the boat is not traveling through the water. Water is automatically supplied to the live well when the boat is traveling through the water. The apparatus also includes means for powering the pump.

6 Claims, 6 Drawing Figures

FORCED AERATING MEANS FOR INBOARD LIVE WELLS

BACKGROUND OF THE INVENTION

This invention relates to a forced aerating apparatus for inboard live wells.

In fishing competition, it is desirable to maintain the fish, once caught, in a live condition for subsequent measuring, weighing, etc. Many types of live wells have been previously provided but the devices of which applicant has knowledge suffer from many disadvantages.

Therefore, it is a principal object of the invention to provide a live well for a fishing boat which is positioned within the boat.

A further object of the invention is to provide an inboard live well including means for supplying aerated water thereto while the boat is moving or stationary.

A still further object of the invention is to provide a continuous aerating system for a live well when the boat is either moving or stationary.

A still further object of the invention is to provide an inboard live well having an intake pipe positioned outwardly of the boat and which includes means for automatically pivoting upwardly and rearwardly upon striking an obstruction or the like.

A further object of the invention is to provide a forced aerating means for inboard live wells including means for draining accumulated water from the boat.

A still further object of the invention is to provide a forced aerating means for inboard live wells which is economical to manufacture, durable in use and refined in appearance.

DESCRIPTION OF THE PREFERRED EMBODIMENT

Figure 1:
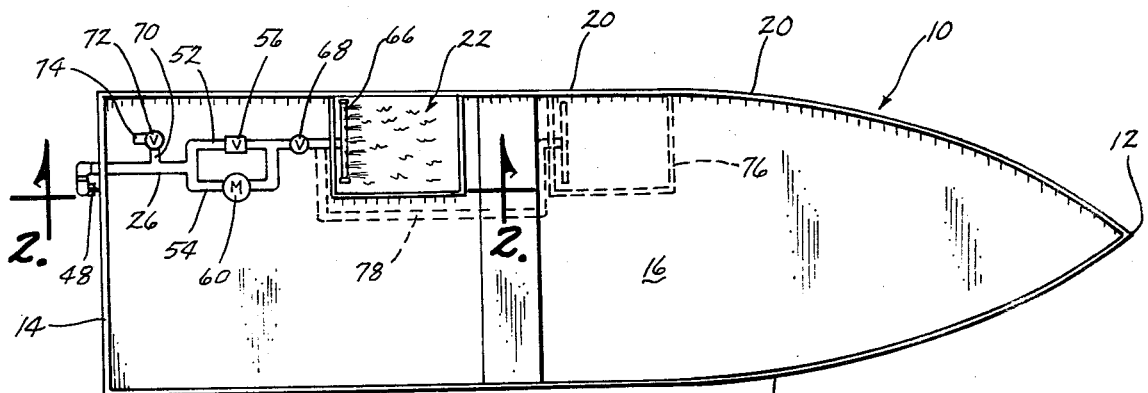
FIG. 1 is a top view of a fishing boat having the apparatus of this invention mounted thereon with the broken lines indicating an optional second live well.

The numeral 10 refers generally to a conventional fishing boat comprising bow 12, stern 14, bottom 16 and sides 18 and 20. The numeral 22 refers generally to a "live well" or tank having an open upper end. Well 22 is provided with a water discharge port 24 including conventional valving which permits water to be discharged outwardly through the side 20 upon the water level in the well 22 reaching a predetermined heighth.

Figure 4:
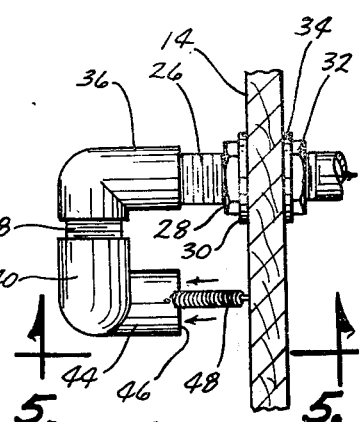
FIG. 4 is an enlarged sectional view seen on lines 4—4 of FIG. 2.
Figure 3:
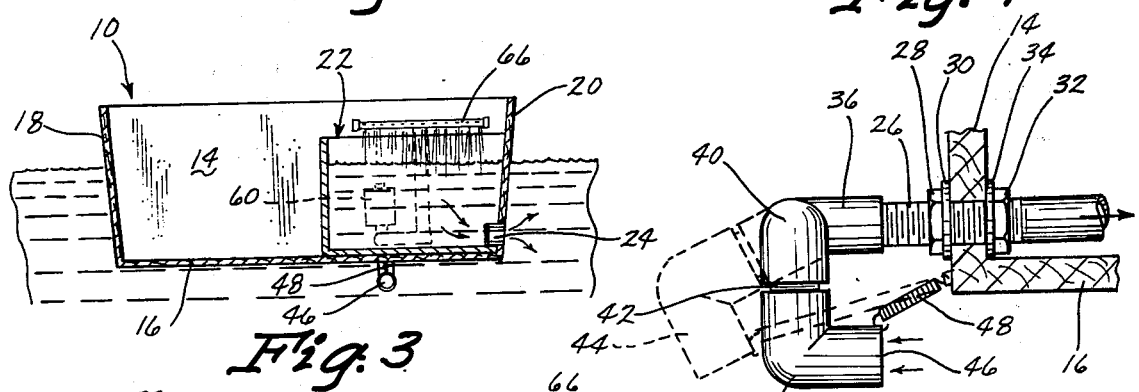
FIG. 3 is a sectional view seen on lines 3—3 of FIG. 2.
Figure 5:
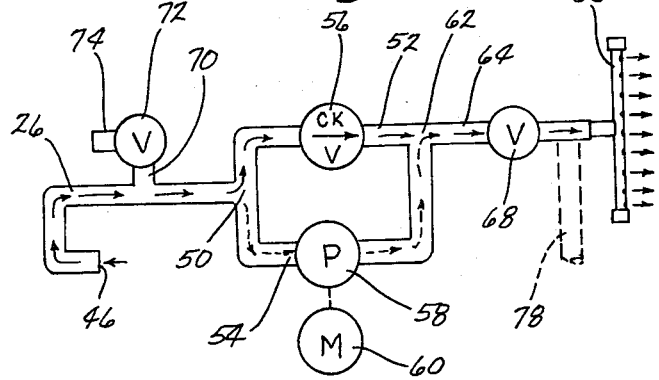
FIG. 5 is a sectional view similar to FIG. 4 but which illustrates the water intake pipe pivotally moving upwardly.

Threaded pipe 26 extends through stern 14 and is maintained therein in a sealed condition by nut 28 and washer 30 on one side thereof and nut 32 and washer 34 at the other side thereof as seen in FIG. 4. Elbow 36 is threadably mounted on the rearward end of pipe 26 and has nipple 38 extending horizontally and laterally therefrom. Elbow 40 is threadably mounted on the outer end of nipple 38 and has a nipple 42 threadably secured thereto and extending downwardly therefrom. Elbow 44 is threadably mounted on the lower end of nipple 42 and has an intake end 46 extending forwardly beneath the bottom 16 of the boat 10. Elbow 40 is loosely threadably secured to the nipple 38 to enable the elbow 40, nipple 42 and elbow 44 to pivotally move upwardly and rearwardly from the position indicated by solid lines in FIG. 5 to the position illustrated by broken lines in FIG. 5 upon the intake end 46 striking an obstruction or the like. Spring 48 extends between elbow 44 and stern 14 as illustrated in FIGS. 4 and 5 to normally and yieldably maintain the elbow 44 in the position illustrated by solid lines in FIG. 5.

Figure 2:
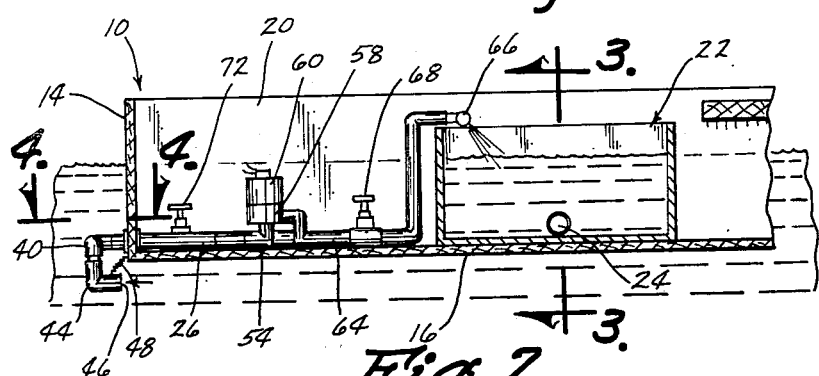
FIG. 2 is a sectional view seen on lines 2—2 of FIG. 1.
Figure 6:
FIG. 6 is a schematic view of the circuitry for supplying the water to the live well.

Pipe 26 extends forwardly from stern 14 above bottom 16 as illustrated to a T-fitting referred to generally by the reference numeral 50. Pipes 52 and 54 extend from T-fitting 50 as illustrated in FIGS. 1 and 6. Check valve 56 is imposed in line 52 while pump 58 is imposed in line 54. Electric motor 60 is operatively connected to the pump 58 for powering the same. Motor 60 would be driven from conventional direct current batteries provided in the boat or by the boat electrical system if so included. For purposes of description, lines 52 and 54 are connected at 62 to a pipe 64 extending forwardly therefrom. As seen in FIG. 2, pipe 64 extends upwardly adjacent the rearward end of well 22 and has a spray bar or aerating means 66 provided on its upward forward end for spraying water into the interior of the well 22. During spraying of the water into the well 22, oxygen is mixed with water to insure that the fish will be able to survive within the well.

The numeral 68 refers to a conventional manually operated valve imposed in line 64. As seen in FIGS. 1 and 6, pipe 70 is in communication with pipe 26 and extends horizontally therefrom. A manually operated valve 72 is connected to pipe 70 and has an intake pipe 74 extending horizontally therefrom closely adjacent the upper surface of floor 16. The numeral 76 refers to an optional live well which may be positioned within the boat if necessary. The live well 76 is identical to the live well 22 and would have a water pipe 78 connected to pipe 64 as illustrated in FIG. 1.

Assuming that the boat is traveling through the water, the operation of the apparatus is as follows. Valve 68 is normally open and valve 72 is normally closed. The intake end 46 of elbow 44 is in the position illustrated in FIG. 2 so that forward movement of the boat causes water to enter the interior thereof and to be supplied to the spray bar 66 by means of pipes 26, 52 and 64. The water is sprayed into the interior of the live well to supply fresh and aerated water thereto. The excess water passes outwardly from the boat through the port 24 as previously described.

If the boat is going to remain stationary in the water, it is necessary for the motor 60 to be energized so that water will be supplied to the spray bar. Actuation of the motor 60 causes pump 58 to be operated which causes water to be drawn inwardly to the intake end 46 of elbow 44 and to be supplied to the spray bar 66 by means of pipes 26, 54 and 64. Check valve 56 prevents the pump from pumping the water in a reverse direction through the line 52.

When the boat is removed from the water and has been found to have collected water in the interior thereof, valve 72 may be opened to permit the water within the boat to enter pipe 74, pass through valve 72, pipe 70 and pipe 26 and outwardly through end 46.

Thus it can be seen that a novel aerating apparatus has been provided for inboard live wells wherein aerated water may be continuously supplied to the live well whether the boat is stationary or traveling through the water. It can also be seen that a novel means has been provided for drawing the water inwardly into the system.

Thus it can be seen that the invention accomplishes at least all of its stated objectives.

I claim:

1. In combination, a boat, at least one live well within said boat, a water pipe means having a discharge end positioned within said boat adjacent said well for supplying water thereto and an intake end positioned outwardly of said boat below the water line thereof and extending forwardly relative to the direction of travel of said boat with said forwardly extending portion of said intake end pivotally mounted to permit it to pivotally move upwardly if it strikes an obstruction, a water aerator means on said discharge end, a pump means in said boat positioned externally of said well and connected to said water pipe means for selectively pumping water from outside said boat through said aerator means, said water pipe means including a pump by-pass pipe such that the movement of said boat through the water will cause water to be directed into said intake end, through said by-pass pipe to said water aerator means, and means for powering said pump means.

2. The combination of claim 1 wherein a check valve means is provided in said by-pass pipe.

3. The combination of claim 1 wherein a drain pipe means is positioned in said boat and is operatively connected to said water pipe means for selectively draining water within said boat outwardly through said water pipe means intake end.

4. The combination of claim 3 wherein a normally closed valve means is imposed in said drain pipe means.

5. The combination of claim 1 wherein said water aerator means comprises a spray pipe positioned above said well.

6. The device of claim 1 wherein an excess water drain means is in communication with said well for draining the excess water therefrom outwardly of said boat.

* * * * *